(12) United States Patent
Cisłak et al.

(10) Patent No.: US 12,608,887 B2
(45) Date of Patent: Apr. 21, 2026

(54) METHOD AND SYSTEM FOR GENERATING ANONYMIZED 3D DATA

(71) Applicant: HEXAGON INNOVATION HUB GMBH, Heerbrugg (CH)

(72) Inventors: Aleksander Juliusz Cisłak, Łódź (PL); Bartłomiej Michał Gralewicz, Florentynów (PL); Łukasz Cyran, Bełchatów (PL)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 111 days.

(21) Appl. No.: 18/652,661

(22) Filed: May 1, 2024

(65) Prior Publication Data

US 2024/0371099 A1     Nov. 7, 2024

(30) Foreign Application Priority Data

May 3, 2023     (EP) .................................... 23171257

(51) Int. Cl.
| | |
|---|---|
| G06T 17/20 | (2006.01) |
| G06T 3/40 | (2006.01) |
(Continued)

(52) U.S. Cl.
CPC ................ G06T 17/20 (2013.01); G06T 3/40 (2013.01); G06T 5/50 (2013.01); G06V 10/44 (2022.01);
(Continued)

(58) Field of Classification Search
CPC ............. G06F 21/6254; G06F 21/6245; G06F 18/241; G06F 18/26; G06T 2207/30196;
(Continued)

(56) References Cited

U.S. PATENT DOCUMENTS

| | | |
|---|---|---|
| 2020/0027200 A1 | 1/2020 | Celestini |
| 2021/0295581 A1 | 9/2021 | Roland et al. |

(Continued)

FOREIGN PATENT DOCUMENTS

| | | |
|---|---|---|
| EP | 3 333 541 A2 | 6/2018 |
| EP | 4 095 561 A1 | 11/2022 |

(Continued)

OTHER PUBLICATIONS

Extended European Search Report dated Sep. 26, 2023 as received in Application No. 23171257.1.

*Primary Examiner* — Hau H Nguyen
(74) *Attorney, Agent, or Firm* — Maschoff Brennan

(57)     ABSTRACT

A computer-implemented method for generating anonymized 3D data of a surrounding, the surrounding comprising a multitude of 3D features of a plurality of feature categories, the plurality of feature categories including at least a first feature category, 3D features of which being designated for anonymization, the method comprising providing 3D data of the surrounding, the 3D data comprising 3D patterns, the 3D patterns corresponding to the 3D features in the surrounding, wherein a first pattern type corresponds to the first feature category, the method comprising identifying at least a first portion of the mesh or point cloud that comprises at least a first 3D pattern of the first pattern type, the first portion of the mesh or point cloud corresponding to a first data portion of the 3D data, and obtaining at least one alternative 3D pattern for the first pattern type.

20 Claims, 5 Drawing Sheets

(51) Int. Cl.
    *G06T 5/50*       (2006.01)
    *G06V 10/44*     (2022.01)
    *G06V 40/16*     (2022.01)

(52) U.S. Cl.
    CPC .. *G06V 40/168* (2022.01); *G06T 2207/20221*
                          (2013.01)

(58) Field of Classification Search
    CPC ....... G06T 15/205; G06T 17/00; G06T 19/00;
              G06T 19/20; G06T 2219/2021; G06V
                                    40/10
    See application file for complete search history.

(56)                References Cited

U.S. PATENT DOCUMENTS

2023/0244815 A1*   8/2023   Herman ............... G06V 40/168
                                          726/26
2024/0054247 A1*   2/2024   Jurzak ................. G06F 21/6254

FOREIGN PATENT DOCUMENTS

EP         4 167 195 A1     4/2023
WO     2020/126123 A2     6/2020

* cited by examiner

METHOD AND SYSTEM FOR GENERATING ANONYMIZED 3D DATA

BACKGROUND

The present disclosure pertains to a computer-implemented method and a computer system for generating anonymized three-dimensional (3D) data relating to a 3D mesh or point cloud. The 3D data is anonymized by removing sensitive 3D information from the mesh or point cloud and replacing it with 3D information that appears natural so that the anonymization is not apparent to a human user ("Deep Natural Anonymization"). The sensitive 3D information to be anonymized may comprise human faces, 3D texts or similar shapes. Optionally, image data of the same environment is anonymized together with the 3D data, e.g. in order to generate an anonymized colorized 3D point cloud.

Reality-capture devices that capture 3D data and image data simultaneously are known in the art. The 3D data may be captured by a laser scanner or an arrangement of time-of-flight cameras and be stored as a mesh or a point cloud. The image data may be used for providing colour and brightness information to the 3D data, e.g. as a colorized 3D point cloud. EP 3 333 541 A2 discloses a surveying system for capturing images and 3D point clouds of a surrounding, wherein faces and license plates may be recognized in the images and then are anonymized the 3D point cloud by removing or blurring the respective points of the point cloud.

SUMMARY

It would be desirable if it would not be necessary to take images of the surrounding, or to improve the anonymization in poor lighting conditions. It would also be desirable to provide a method and system that allow anonymizing the 3D data in a way that looks more natural so that the anonymization is less distracting for the human user.

It is therefore an object to provide an improved method and system for anonymizing sensitive data that overcome the disadvantages of the prior art.

It is a particular object to provide such a method and system that do not require capturing images, particularly a method and system that allow detecting the sensitive 3D information directly in the 3D data.

It is a particular object to provide such a method and system that reliably anonymize sensitive data even if the images suffer from poor lighting conditions or cover less details than a 3D scan.

It is another object to provide such a method and system that allow deep natural anonymization of 3D data.

At least one of these objects is achieved by the method and/or the computer system described.

A first aspect pertains to a computer-implemented method for generating anonymized three-dimensional data (3D data) of a surrounding, the surrounding comprising a multitude of three-dimensional features (3D features) of a plurality of feature categories, the plurality of feature categories including a first feature category, 3D features of which being designated for anonymization. The method comprises providing 3D data of the surrounding, the 3D data comprising information about a mesh or a point cloud comprising three-dimensional patterns (3D patterns) of a plurality of pattern types, the 3D patterns corresponding to the 3D features in the surrounding, wherein a first pattern type corresponds to the first feature category. According to this aspect, at least a first portion of the mesh or point cloud that comprises at least a first 3D pattern of the first pattern type, the first portion of the mesh or point cloud corresponding to a first data portion of the 3D data. At least one alternative 3D) pattern for the first pattern type is obtained, each alternative 3D pattern comprising pre-defined or generated 3D data.

An anonymization algorithm is used to replace the first data portion with alternative 3D data comprising at least one alternative 3D pattern of the first pattern type to generate anonymized 3D data.

According to some embodiments of the method, identifying the first portion of the mesh or point cloud is based on the 3D data, particularly only based on the 3D data.

According to some embodiments of the method, identifying the first portion of the mesh or point cloud is performed by the anonymization algorithm.

According to some embodiments of the method, identifying the first portion of the mesh or point cloud comprises detecting, in the 3D data, at least one shadow on a surface in the surrounding, which shadow results from a 3D feature that is positioned between the surface and a reality capture device capturing the 3D data (shadow-casting feature), wherein the shadow-casting feature belongs to the first feature category. Replacing the 3D data comprises replacing the detected shadow with alternative 3D data corresponding to the alternative 3D pattern of the first pattern type used for replacing the shadow-casting feature. For instance, the shadow may be a data gap on the surface, fully or partially having the shape of the shadow-casting feature. However, the shadow itself does not need to belong to the first pattern type. It may be replaced nonetheless with alternative 3D data that matches the alternative 3D data of the shadow-casting feature to ensure Deep Natural Anonymization, i.e. so that the anonymization does not become visible to a human user from an apparent divergence of replaced 3D features and not replaced shadows.

According to some embodiments, the method comprises receiving anonymization information about one or more designated feature categories, features of which being designated for anonymization.

In one embodiment, the anonymization information is received as a user input, the user input designating one or more feature categories for anonymization. For instance, one or more feature categories are provided to a user and the user input comprises a selection of one or more feature categories, wherein features belonging to the selected feature categories are designated for anonymization.

According to some embodiments of the method,
the 3D features in the surrounding comprise three-dimensional alphanumeric characters comprising letters and/or numerals, e.g. at least one text or number comprising a sequence of three-dimensional alphanumeric characters,
the first feature category comprises alphanumeric characters, texts or numbers,
the alternative patterns include 3D alphanumeric characters, particularly texts or numbers comprising a plurality of alphanumeric characters, and
identifying the first portion in the mesh or point cloud comprises detecting 3D features representing alphanumeric characters.
In one embodiment,
the alternative 3D patterns are user-defined patterns comprising 3D data that is generated based on a user input,
the method comprises generating 3D data based on the user input, and
the first portion of the 3D data is replaced with the generated 3D data.

In this case, the user input may comprise at least one alphanumeric character, e.g. a text or number comprising plurality of alphanumeric characters, and/or a typeface for the alphanumeric characters, e.g. at least one of a font, size, weight, slope and width.

According to some embodiments of the method,
the surrounding comprises at least one person,
the first feature category comprises human faces,
the alternative patterns comprise a multitude of pre-defined patterns, each comprising pre-defined 3D data of a human face, particularly of an artificially generated face, and
identifying the first portion in the mesh or point cloud comprises detecting 3D features representing human faces.

According to some embodiments of the method, the anonymization algorithm receives image data of the surrounding, correlates the image data with the 3D data, and replaces a first portion of the image data with alternative image data, the first portion of the image data corresponding to the first portion of the mesh or point cloud. A set of alternative image data is then assigned to each of the alternative 3D patterns and the image data is replaced with at least a part of the set of alternative image data assigned to the alternative 3D data replacing the first portion of the 3D data.

In some embodiments, the method comprises identifying at least a first portion in the image data that images at least one feature of the first feature category, identifying the first portion in the mesh or point cloud comprises determining, based on the 3D data, whether the feature in the first portion of the image data is a 3D feature, and the first portion of the 3D data and the first portion of the image data are only replaced if the feature is three-dimensional. In one embodiment, the first feature category comprises only 3D features.

According to some embodiments, the method comprises determining a pose of the first 3D pattern. In one embodiment, the alternative 3D patterns comprise pre-defined patterns comprising pre-defined 3D data, and replacing the 3D data comprises selecting, based on the determined pose, an alternative pattern to replace the 3D data. In one embodiment, replacing the 3D data comprises adjusting a pose of the alternative 3D pattern based on the determined pose. Preferably, a pose of the selected alternative 3D pattern matches the determined pose.

According to some embodiments of the method, replacing the 3D data comprises adjusting a size and/or resolution of the alternative 3D pattern to match a size and/or resolution, respectively, of the first pattern.

According to some embodiments, the method comprises providing an indicator to indicate that the 3D data has been replaced. Optionally, it can be added directly to the replaced 3D data or to 2D data corresponding to the replaced 3D data. Also, the indicator may be provided as meta information and not be directly visible in the mesh or point cloud or the 2D data.

According to some embodiments of the method, the alternative 3D patterns comprise pre-defined patterns comprising pre-defined 3D data, the pre-defined patterns being retrieved from a database comprising a plurality of pre-defined 3D patterns for a plurality of pattern types, and the method comprises determining a pattern type of the first 3D pattern from the plurality of pattern types.

According to some embodiments of the method, the alternative 3D patterns comprise user-defined patterns comprising 3D data that is generated based on a user input.

According to some embodiments of the method, the alternative 3D patterns comprise user-adapted patterns comprising pre-defined 3D data that is adapted based on a user input.

According to some embodiments of the method, the alternative 3D patterns comprise pre-defined patterns comprising pre-defined 3D data, the method comprising presenting a plurality of pre-defined patterns for the first pattern type to a user and receiving a user input with a selection of a pre-defined pattern, wherein the 3D data is replaced with the pre-defined 3D data of the selected pre-defined pattern.

According to some embodiments of the method, the 3D data is point cloud data comprising information about a point cloud including spatial coordinates of a multitude of points in the surrounding, the 3D features in the surrounding corresponding to 3D patterns in the point cloud, and the pre-defined or generated 3D data is pre-defined or generated point cloud data.

According to some embodiments of the method, providing the 3D data of the surrounding comprises capturing the 3D data using a reality capture device comprising at least one laser scanner and/or time-of-flight camera. For instance, the method may be performed by the reality capture device and comprises providing the anonymized 3D data to one or more external devices.

Some embodiments pertain to a computer-implemented method for generating an anonymized colorized point cloud of a surrounding, the surrounding comprising a multitude of 3D features of a plurality of feature categories, the plurality of feature categories including at least a first feature category, 3D features of which being designated for anonymization. Such a method comprises providing image data and point cloud data of the surrounding, and correlating the image data with the point cloud data, the point cloud data comprising information about a point cloud including spatial coordinates of a multitude of points in the surrounding, the 3D features in the surrounding corresponding to 3D patterns in the point cloud, wherein a first pattern type corresponds to the first feature category. Such a method further comprises an anonymization algorithm
identifying, based at least on the point cloud data, at least a first portion of the point cloud that comprises at least a first 3D pattern of the first pattern type, the first portion of the mesh or point cloud corresponding to a first data portion of the point cloud data,
retrieving
at least one alternative 3D pattern for the first pattern type, each alternative 3D pattern comprising pre-defined or generated point cloud data, and
alternative image data, wherein a set of alternative image data is assigned to each of the alternative 3D patterns, and
replacing, to generate anonymized colorized point cloud data,
the first data portion with alternative point cloud data for the first pattern type, and
a first portion of the image data with alternative image data, the first portion of the image data corresponding to the first portion of the point cloud, wherein the image data is replaced with at least a part of the set of alternative image data assigned to the alternative point cloud data replacing the first portion of the point cloud data.

A second aspect pertains to a computer system that is configured for performing the method according to the first aspect. For instance, the computer system may be a part of a reality capture device comprising at least one laser scanner and/or time-of-flight camera or comprise such a reality capture device, wherein the reality capture device may capture the 3D data.

A third aspect pertains to a computer program product comprising program code for performing the method according to the first aspect, for instance when running on the computer system according to the second aspect. The computer program product may be a non-transitory computer-readable device having instructions stored thereon that, when executed by at least one computing device, causes the at least one computing device to perform the method.

BRIEF DESCRIPTION OF THE DRAWINGS

Aspects will be described in detail by referring to exemplary embodiments that are accompanied by figures, in which.

DETAILED DESCRIPTION

Figure 1:
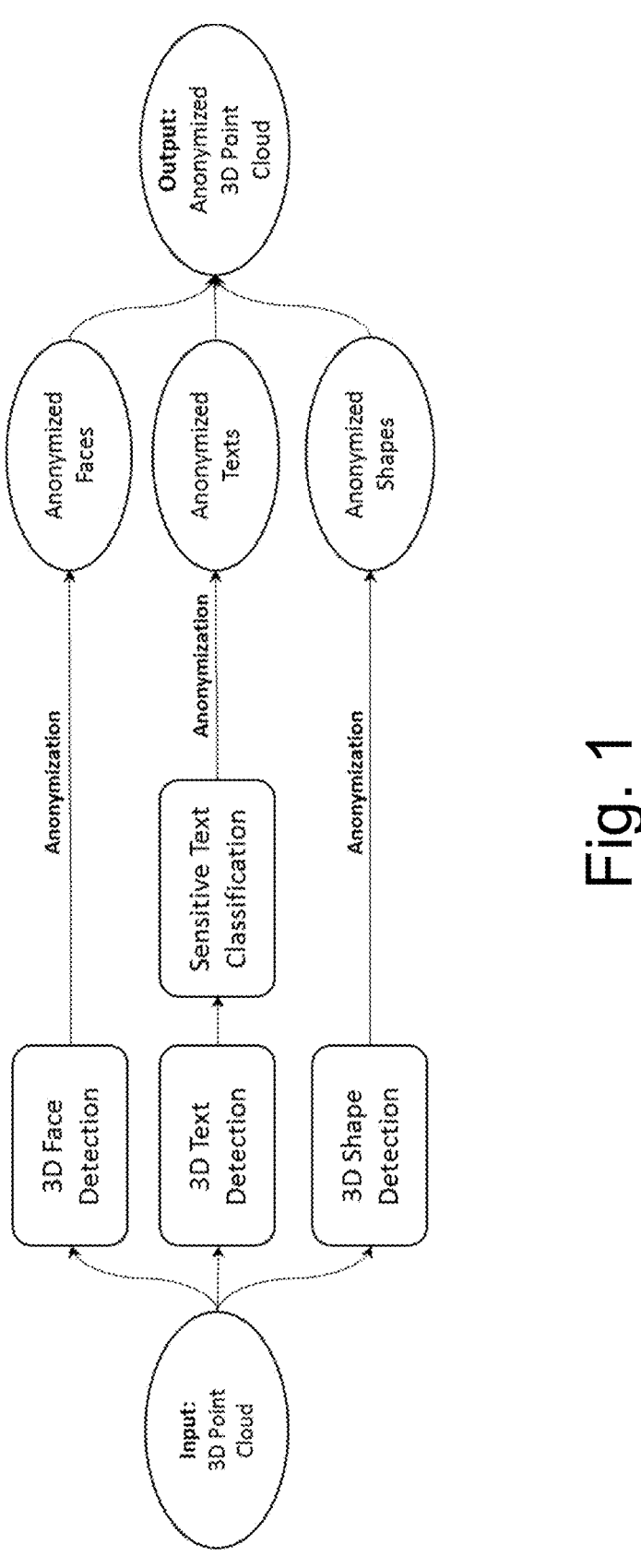
FIG. 1 illustrates the anonymization of a point cloud.

In FIG. 1, a 3D point cloud is to be anonymized. 3D) point cloud data is provided as input (other 3D) data than point cloud data may be used similarly, e.g. data related to a 3D mesh). A detection algorithm detects certain features in the point cloud data that relate to sensitive information and should be made unrecognizable in the 3D data. In the shown example, this pertains to faces, as well as sensitive texts and shapes that are visible in the 3D data. The detection algorithm searches the point cloud for 3D faces, 3D texts and other pre-defined shapes. Other pre-defined shapes, e.g. may comprise human poses or geometric company logos.

If 3D texts are determined, it may optionally be determined whether they relate to classified or otherwise sensitive information. A sensitive-text classification algorithm could distinguish between public and sensitive information, e.g. names of people or companies, phone numbers, license plates etc. The determined faces, texts and other shapes that are to be anonymized are then replaces by generic, user- or computer-generated faces, texts and shapes, respectively. This results in an anonymized 3D point cloud as output.

Figure 2:
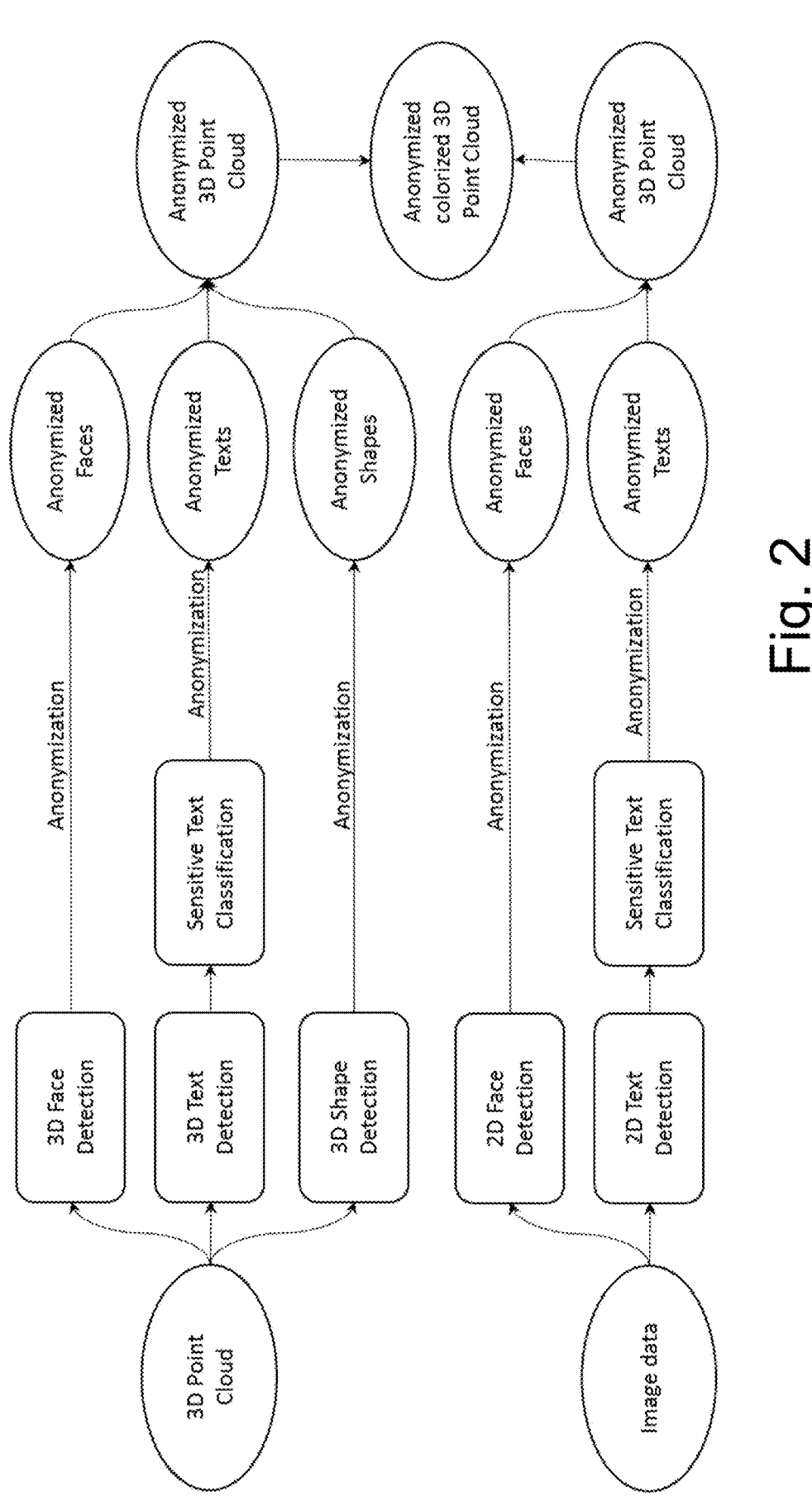
FIG. 2 illustrates the anonymization of a colorized point cloud.

In FIG. 2, additionally, image data of the same environment is available and to be anonymized. Using the image data, an anonymized colorized 3D point cloud can be generated as output. The goal of this workflow is to process a 3D) point cloud coupled with related 2D image data to remove sensitive information from the final colorized 3D point cloud. Typical use-cases include anonymization of human faces, license plates, sensitive documents etc.

Many reality capture devices include, both, 2D cameras for capturing images of a surrounding, and means for simultaneously capturing 3D data—such as laser scanners or time-of-flight (TOF) cameras. For example, such reality capture devices are disclosed in WO 2020/126123 A2 and in EP 4 095 561 A1.

Optionally, the image data can be used to support the identification of portions of the 3D data which comprise 3D features that need to be anonymized. If such a feature, e.g.

a face or text, has been detected in the images, the 3D data may be used to determine whether the feature is two- or three-dimensional. If the feature is two-dimensional, no anonymization of the 3D data is needed.

Also, especially in the case of faces, two-dimensional features may not have to be anonymized in the images. For instance, faces depicted on posters or billboards may not have to be anonymized. Using the 3D data, 2D faces and 3D faces in the surrounding can easily be distinguished from one another and only 3D faces are then anonymized in the images and the 3D data. Similarly, the image data may be used to confirm whether a 3D feature detected in the point cloud is really a human face that needs to be anonymized. For instance, faces of display dummies or mannequins need not be replaced.

Figure 3:
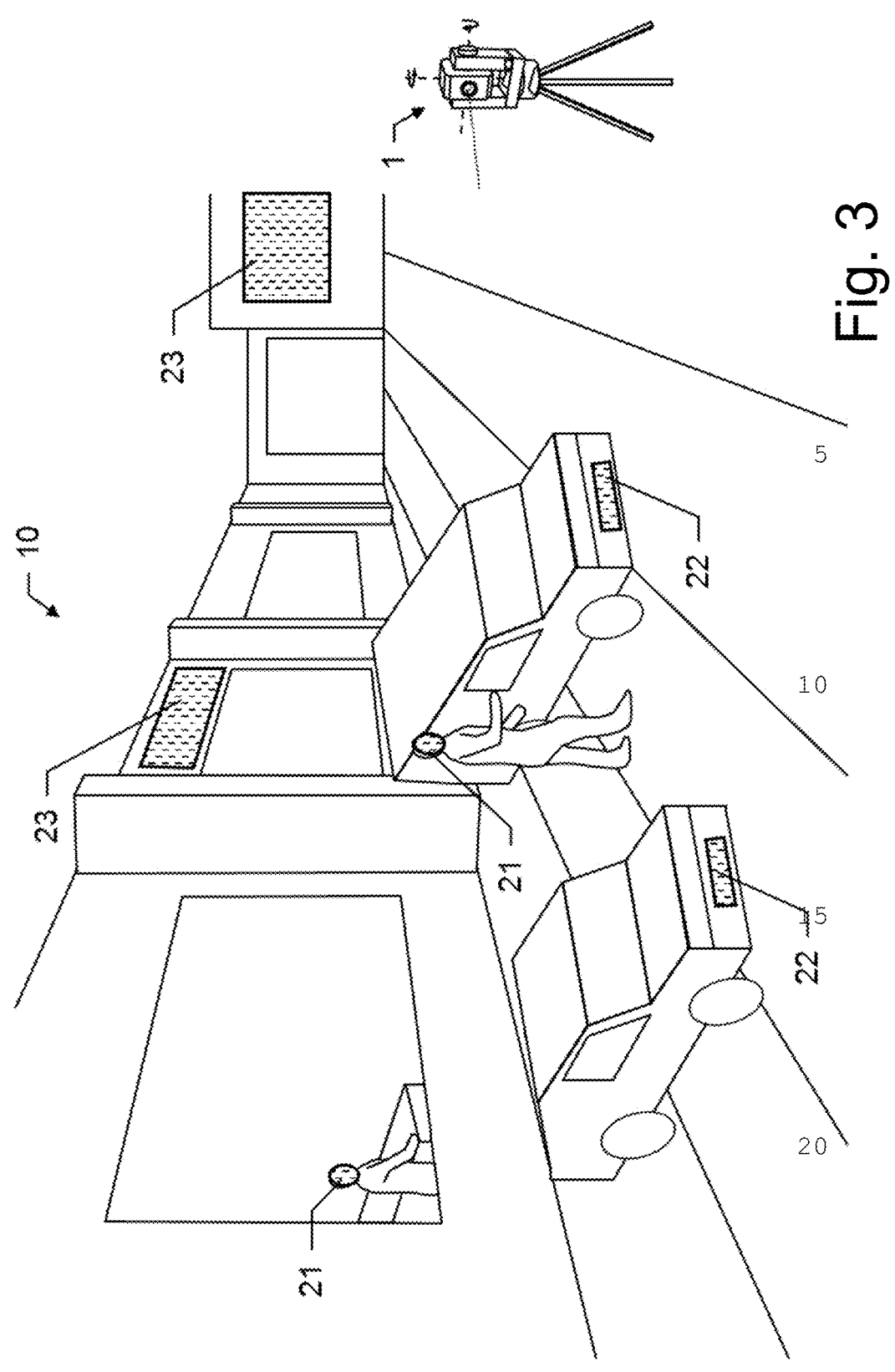
FIG. 3 shows capturing 3D data of a surrounding comprising features to be anonymized.

FIG. 3 shows a reality capture device 1 capturing 3D) data, e.g. as a point cloud, of its surrounding 10—optionally together with image data. Point clouds might be produced by a sensor (laser scanner, TOF camera) or by photogrammetry (i.e. from 2D images). For instance, the reality capture device 1 may be configured as or comprise a hand-held, backpack, car-mounted, autonomous or static laser scanner.

In the shown surrounding 10, people are present as well as parked cars and 3D writing—e.g. advertising stores. Faces 21, license plates 22 and 3D texts 23 should be made unrecognizable in the point cloud. This anonymization may either be performed in post-processing, e.g. on an external computing device (not shown here), or in edge-processing ("on the fly") on the reality capture device 1, so that no unanonymized data ever leaves the device 1.

Anonymization of 3D data is possible on different levels. The simplest approach is to focus solely on 2D image data, anonymize it and then re-colorize the 3D point cloud. Disadvantageously, only colour information is changed with this approach, while the geometry stays the same. Thus, information that would allow recognize faces, texts or other 3D) shapes may still be present in the 3D data. A more sophisticated approach takes advantage of the 3D point cloud data from the very beginning and applies 3D) modifications, making the data unrecognizable on both the colour and geometry information level. This approach can also be further extended to combine the strengths of both approaches. Using both 2D and 3D modalities has the potential to greatly increase the quality of the final result, stemming from more complete information. Moreover, artefacts which may be present in only one modality can be detected and tackled. Examples of such artefacts may include poor lighting conditions (artefact appears in 2D) but not in 3D)) or transparent materials causing reflections (artefact appears in 3D but not in 2D).

Figure 4:
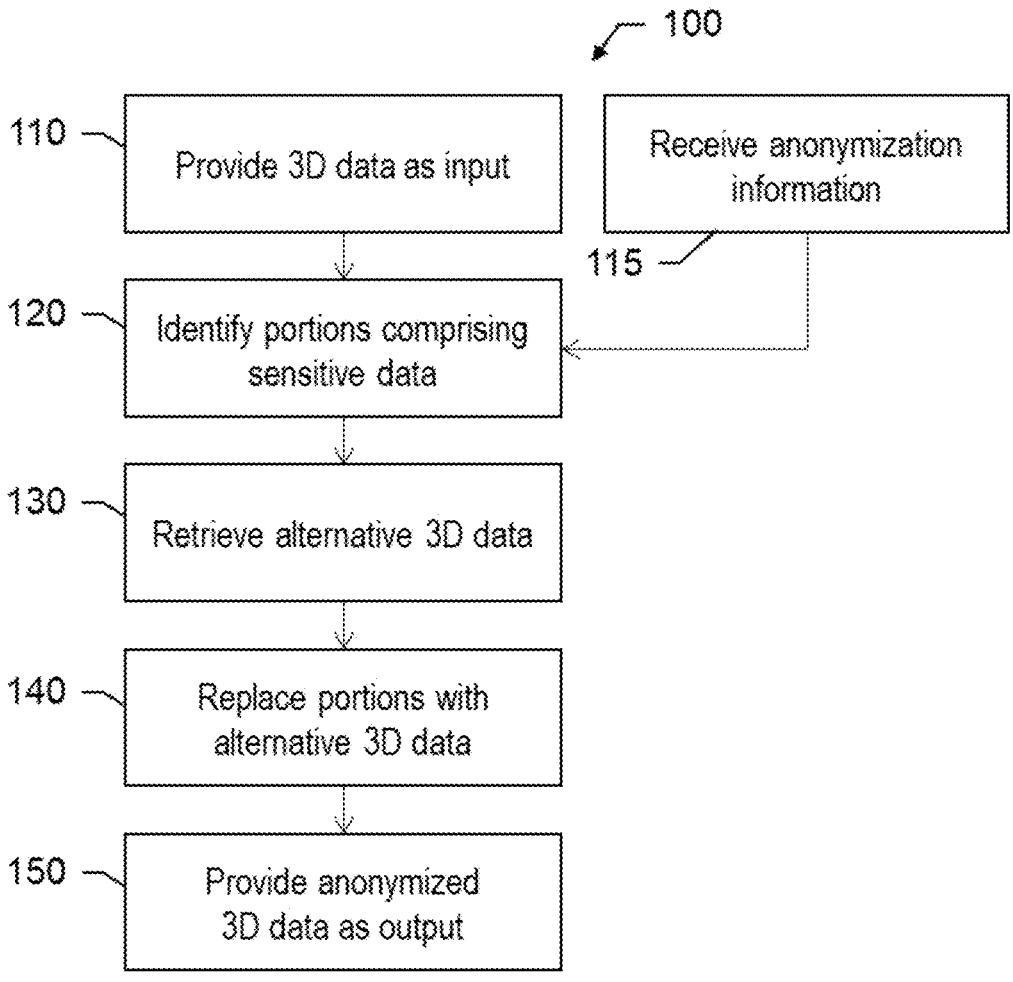
FIG. 4 shows a flow chart illustrating steps of a first example embodiment of a method.

FIG. 4 shows a flow chart illustrating a first exemplary embodiment of a computer-implemented method 100 that allows generating anonymized 3D data of a surrounding.

The surrounding may comprise a multitude of 3D features of a plurality of different feature categories. At least one feature category relates to 3D features that are designated for anonymization. In a first step of the method 100, 3D data of the surrounding is provided 110 as input. The 3D data for instance may comprise information about a mesh or a point cloud that comprise 3D) patterns corresponding to the 3D features in the surrounding. Providing 110 the 3D data may involve a reality-capture device capturing the data using a laser scanner or one or more TOF cameras. Alternatively, providing 110 the 3D data may comprise receiving the 3D) data from the reality-capture device or from a data base.

According to the shown embodiment, the method further comprises receiving 115 anonymization information about feature categories that should be anonymized. For instance, the anonymization information may be received as a user input, wherein a user designates one or more feature categories for anonymization. One or more feature categories may be provided to a user and the user input comprises a selection of one or more feature categories, wherein features belonging to the selected feature categories are designated for anonymization. The anonymization information may also comprise information on whether 2D faces should be anonymized or not, or what kinds of texts or logos should be anonymized.

An algorithm then identifies 120 those portions of the 3D data, e.g. of the point cloud, that comprise patterns of a pattern type that should be anonymized, e.g. faces and license plates. Optionally, a user may select pattern types that have been identified by the algorithm for anonymization, and/or perform the identification 120 without the help of the algorithm.

Optionally, the identification 120 may comprise identifying data gaps in the shape of a pattern type that should be anonymized, i.e. the portions may be identified based on a lack of 3D data. This may include 2D and 3D features that become visible, e.g. as data gaps, in the 3D data due to a high reflectivity of their surfaces or a transparency of the material (e.g. glass).

For instance, highly reflective numerals on otherwise less reflective license plates may lead to a lack of data points for these numerals in the 3D data. However, since the 3D data comprises data points for the surrounding, i.e. the rest of the license plates, these data gaps have the shape of the numerals, and depending on the resolution of the 3D data-could be recognized. Therefore, also such data gaps may be features that need to be anonymized in the 3D data and, thus, need to be identified 120 as such.

The identification 120 may also comprise identifying 2D features that are visible in the 3D data. For instance, adhesive stickers or labels might be provided on reflecting or transparent surfaces, such as mirrors or windows, in the surrounding. If such a sticker or labels has a 2D shape that is recognizable in the 3D data and represents a feature that should be anonymized, also such 2D features need to be identified 120. For instance, such 2D features may be a number of stickers provided on a display window, each sticker having the shape of a numeral, together forming a phone number, which needs to be anonymized. Also such 2D features may be identified 120 by data gaps. For instance, on a window a sticker may be provided that comprises a text that is cut-out from the sticker or otherwise made transparent. Thus, in the 3D data, data gaps in the shape of the text appear on the window plane.

Identified features may cast a "shadow" in the 3D data. For instance, in the case of the above-mentioned 2D features on a window, 3D data may appear on a wall behind the window plane. The 2D features on the window plane will cast a shadow on this wall, either as a data gap ("positive" shadow) or as data points having the shape of the gap on the window plane ("negative" shadow). Both, the gaps on the window plane and the 3D data behind the window plane need to be anonymized and should therefore be identified 120. Another example is a shadowing of a facial profile in the 3D data: a person standing close to a plane background such as a wall will lead to a shadow in the 3D data on that background that has the shape of the face ("positive" shadow). Depending on the resolution of the 3D data, also this shadow might need anonymization and therefore needs to be identified 120.

In the next step, alternative 3D data for the identified portions is obtained 130. This may comprise retrieving pre-defined 3D patterns, generating new 3D patterns and/or adapting existing 3D patterns.

Pre-defined 3D patterns may be retrieved from a database comprising a plurality of pre-defined 3D patterns for a plurality of pattern types. Obtaining 130 the alternative 3D data may comprise determining the pattern type and selecting a suitable pre-defined pattern for replacing the sensitive 3D data. For instance, this may include automatically determining the pattern type by an algorithm and manually selecting a replacement pattern by the user. To facilitate the selection process, a user selecting one out of a multitude of proposed data replacements can be provided with the proposed data replacements in isolation, with the context of the surrounding 3D data and for multiple patterns at once.

Generated 3D patterns may be computer-generated, e.g. using machine learning algorithms for changing faces or texts to suitable replacements. Generating the 3D) patterns may also involve interaction with a user. For instance, the 3D patterns may be user-defined, e.g. being generated completely or partially based on a user input, or user-adapted, e.g. pre-defined 3D data that is adapted at least partially based on a user input. Also, a pre-selected plurality of pre-defined patterns may be presented to a user, and the user may select one of the pre-defined patterns, and optionally adapt it.

Alternatively, obtaining 130 the alternative 3D data may be based on adapting the original 3D data, e.g. by a user with the help of an algorithm or fully automatically. In the case of a face to be anonymized, a user interface may provide artistic control about the modifications to the user. For instance, such an interface might comprise sliders to modify facial features, e.g. length and width of features such as eyes, nose, chin, forehead etc., or to perform face morphing with 3D data of another face.

In the next step, an algorithm then replaces 140 the 3D data of the identified portion completely or partially with the obtained alternative 3D data, i.e. with pre-defined, computer-generated, user-generated, user-adapted or user-selected 3D data to generate anonymized 3D data. The original point cloud part that needs to be anonymized can be used by the algorithm to decide on the visual characteristics of the replacement data.

If the portions have been identified based on lack of 3D data, each data gap is replaced 140 by a data gap having a different shape, e.g. that of a different numeral. If the portion to be replaced casts a ("positive" or "negative") shadow in the 3D data, this shadow is also anonymized. For the purpose of Deep Natural Anonymization—the shadow is preferably anonymized in such a way that it matches the alternative 3D data, e.g. as if the alternative 3D data would have casted the shadow.

Optionally, some or all of steps 120, 130 and 140 (i.e. identifying portions of the 3D data, obtaining replacement data and replacing portions of the data) can be performed fully automatically by the anonymization algorithm.

Figure 5:
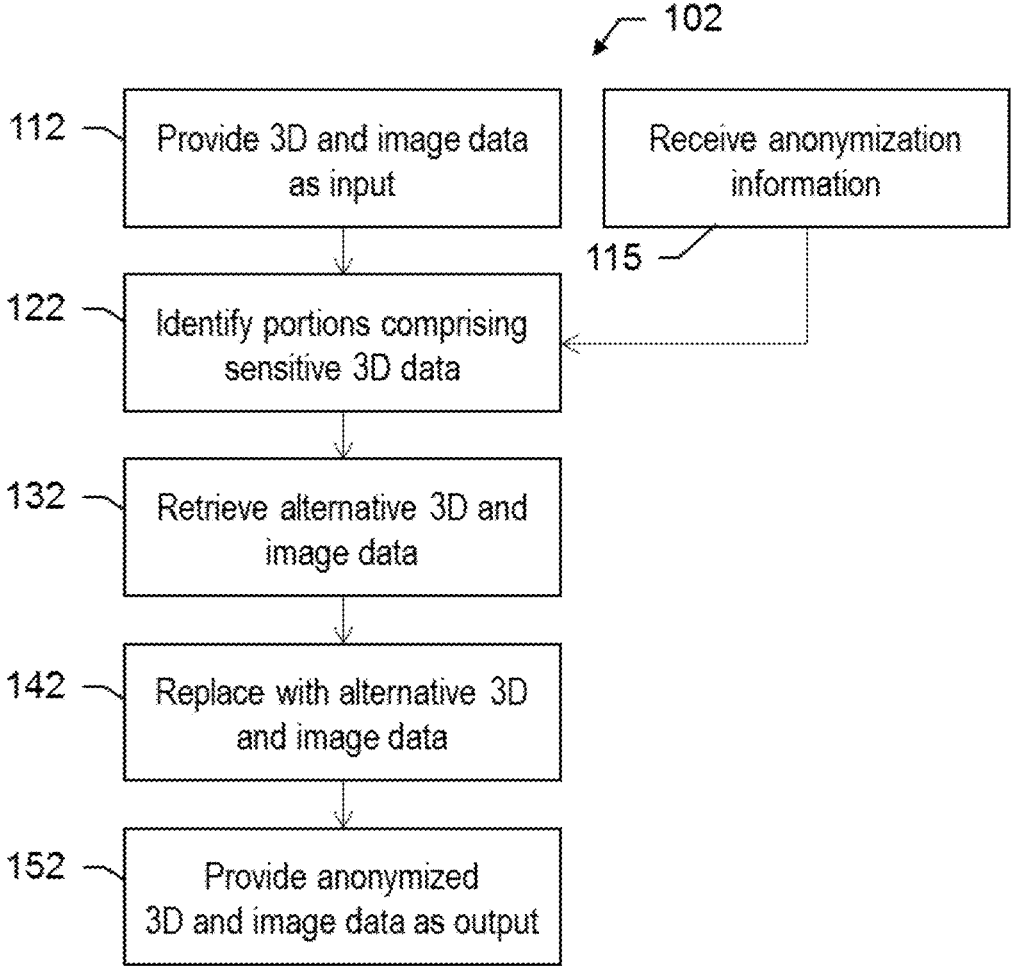
FIG. 5 shows a flow chart illustrating steps of a second example embodiment of a method.

FIG. 5 shows a flow chart illustrating a second exemplary embodiment of a computer-implemented method 102 that allows generating anonymized 3D and image data of a surrounding.

The surrounding may comprise a multitude of features of a plurality of different feature categories. Some of the features are three-dimensional, others are visible in 2D RGB images. At least one feature category relates to 3D features that are designated for anonymization. In a first step of the method 102, 3D data and image data of the surrounding are provided 112 as input. The 3D data for instance may comprise information about a mesh or a point cloud that comprise 3D patterns corresponding to the 3D) features in the surrounding. Providing 112 the 3D data and the image data may involve a reality-capture device capturing the data using one or more 2D RGB cameras and a laser scanner or one or more TOF cameras. The 2D image data may be captured simultaneously with the 3D data. Alternatively, providing 112 the data may comprise receiving the data from the reality-capture device or from a data base.

According to the shown embodiment, the method further comprises receiving 115 anonymization information about feature categories that should be anonymized. For instance, the anonymization information may be received as a user input, wherein a user designates one or more feature categories for anonymization. One or more feature categories may be provided to a user and the user input comprises a selection of one or more feature categories, wherein features belonging to the selected feature categories are designated for anonymization. The anonymization information may also comprise information on whether 2D faces should be anonymized or not, or what kinds of texts or logos should be anonymized.

An algorithm then identifies 122 those portions of the 3D data, e.g. of the point cloud, that comprise patterns of a pattern type that should be anonymized, e.g. faces and license plates. As described with respect to FIG. 4, also data gaps, 2D) features and/or shadows may be identified 122 in the 3D data.

Optionally, the image data may be correlated with the 3D data. This allows identifying the patterns in the 3D data also based on the 2D data. For instance, only those portions of the 3D data are searched for patterns to be anonymized, for which the 2D data indicates their presence.

Typically, both the 3D data and the image data are to be anonymized. In that case, the method comprises identifying portions in the image data that images at least one feature to be anonymized. If only 3D features should be anonymized, it may be determined, based on the 3D data, whether the respective feature shown in the images is a 3D feature.

Alternative 3D data and image data for the identified portions is retrieved 132. The alternative 3D data comprises a pre-defined or generated 3D) pattern, and the alternative image data comprises pre-defined or generated image data.

As described above with respect to FIG. 4, pre-defined 3D patterns may be retrieved from a database comprising a plurality of pre-defined 3D patterns for a plurality of pattern types, or 3D patterns may be computer-generated, user-defined or user-adapted. Likewise, image data may be retrieved from a database or generated by a computer and/or user. Preferably, the retrieved alternative 3D data and alternative image data are matching each other, e.g. are generated together or are provided in a database together. Alternatively, 3D data may be retrieved, and matching image data is generated based on the retrieved 3D data, or image data is retrieved and matching 3D data is generated based on the retrieved image data.

The 3D data and image of the identified portion are then completely or partially replaced 142 with the alternative 3D data and the alternative image data, respectively, i.e. with pre-defined, computer-generated, user-generated, user-adapted or user-selected 3D and image data to generate anonymized 3D and image data, for instance an anonymized colorized point cloud. Optionally, an indicator may be added to the replaced 3D data or to a corresponding part of 2D data mapping the 3D data, to indicate that the replaced 3D data is not original data but has been replaced for anonymization reasons. The indicator may also indicate that the corresponding 2D data has been replaced For instance, a user may upload the data to be anonymized (i.e. 3D data or 3D and 2D data) and possibly further information such as the anonymization information to a remote server or a cloud, where the identification 120, 122 and replacement 140, 142 are performed as a service. The user may then be presented with the anonymized data or with a selection of several differently anonymized sets of data.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A computer-implemented method for generating anonymized 3D data of a surrounding, the surrounding comprising a multitude of 3D features of a plurality of feature categories, the plurality of feature categories including at least a first feature category, 3D features of which being designated for anonymization, the method comprising providing 3D data of the surrounding, the 3D data comprising information about a mesh or a point cloud comprising 3D patterns of a plurality of pattern types, the 3D patterns corresponding to the 3D features in the surrounding, wherein a first pattern type corresponds to the first feature category, comprising:

identifying at least a first portion of the mesh or point cloud that comprises at least a first 3D pattern of the first pattern type, the first portion of the mesh or point cloud corresponding to a first data portion of the 3D data;

obtaining at least one alternative 3D pattern for the first pattern type, each alternative 3D pattern comprising pre-defined or generated 3D data; and replacing, using an anonymization algorithm, the first data portion with alternative 3D data comprising at least one alternative 3D pattern for the first pattern type to generate anonymized 3D data, wherein:

identifying at least the first portion of the mesh or point cloud comprises detecting, in the 3D data, at least one shadow on a surface in the surrounding, which shadow results from a 3D feature that is positioned between the surface and a reality capture device capturing the 3D data, the 3D feature belonging to the first feature category; and replacing the 3D data comprises replacing the detected shadow with alternative 3D data corresponding to the alternative 3D pattern of the first pattern type used for replacing the 3D feature that is positioned between the surface and a reality capture device.

2. The method according to claim 1, wherein identifying at least the first portion of the mesh or point cloud is:

performed by the anonymization algorithm, and/or based on the 3D data, particularly only based on the 3D data.

3. The method according to claim 1, comprising receiving anonymization information about one or more designated feature categories, features of which being designated for anonymization, in particular wherein the anonymization information is received as a user input, the user input designating one or more feature categories for anonymization, particularly wherein one or more feature categories are provided to a user and the user input comprises a selection of one or more feature categories, wherein features belonging to the selected feature categories are designated for anonymization.

4. The method according to claim 1, wherein:
the shadow:
is a data gap on the surface, and/or
does not belong to the first pattern type.

5. The method according to claim 1, wherein:
the surrounding comprises at least one person;
the first feature category comprises human faces; and
the alternative patterns comprise a multitude of pre-defined patterns, each comprising pre-defined 3D data of a human face, particularly of an artificially generated face,
wherein identifying the first portion in the mesh or point cloud comprises detecting 3D features representing human faces.

6. The method according to claim 1, comprising the anonymization algorithm:
receiving image data of the surrounding;
correlating the image data with the 3D data; and
replacing a first portion of the image data with alternative image data, the first portion of the image data corresponding to the first portion of the mesh or point cloud, wherein a set of alternative image data is assigned to each of the alternative 3D patterns and the image data is replaced with at least a part of the set of alternative image data assigned to the alternative 3D data replacing the first portion of the 3D data,
particularly wherein
the method comprises identifying at least a first portion in the image data that images at least one feature of the first feature category;
identifying the first portion in the mesh or point cloud comprises determining, based on the 3D data, whether the feature in the first portion of the image data is a 3D feature; and
the first portion of the 3D data and the first portion of the image data are only replaced if the feature is three-dimensional,
wherein the first feature category comprises only 3D features.

7. The method according to claim 1, comprising determining a pose of the first 3D pattern, wherein:
the alternative 3D patterns comprise pre-defined patterns comprising pre-defined 3D data, and replacing the 3D data comprises selecting, based on the determined pose, an alternative pattern to replace the 3D data;
replacing the 3D data comprises adjusting a pose of the alternative 3D pattern based on the determined pose; and/or
a pose of the selected alternative 3D pattern matches the determined pose.

8. The method according to claim 1, wherein replacing the 3D data comprises:
adjusting a size and/or resolution of the alternative 3D pattern to match a size and/or resolution, respectively, of the first pattern; and/or
providing an indicator indicating that the 3D data has been replaced, particularly wherein the indicator is provided to the replaced 3D data or to 2D data corresponding to the replaced 3D data.

9. The method according to claim 1, wherein the alternative 3D patterns comprise pre-defined patterns comprising pre-defined 3D data, the pre-defined patterns being retrieved from a database comprising a plurality of pre-defined 3D patterns for a plurality of pattern types, and the method comprises determining a pattern type of the first 3D pattern from the plurality of pattern types.

10. The method according to claim 1, wherein the alternative 3D patterns comprise:
user-defined patterns comprising 3D data that is generated based on a user input; and/or
user-adapted patterns comprising pre-defined 3D data that is adapted based on a user input; and/or
pre-defined patterns comprising pre-defined 3D data, the method comprising presenting a plurality of pre-defined patterns for the first pattern type to a user, and receiving a user input with a selection of a pre-defined pattern, wherein the 3D data is replaced with the pre-defined 3D data of the selected pre-defined pattern.

11. The method according to claim 1, wherein:
the 3D data is point cloud data comprising information about a point cloud including spatial coordinates of a multitude of points in the surrounding, the three-dimensional features in the surrounding corresponding to 3D patterns in the point cloud, and
the pre-defined or generated 3D data is pre-defined or generated point cloud data.

12. The method according to claim 1, wherein providing the 3D data of the surrounding comprises capturing the 3D data using a reality capture device comprising at least one laser scanner and/or time-of-flight camera, particularly wherein the method is performed by the reality capture device and comprises providing the anonymized 3D data to one or more external devices.

13. A computer system configured for performing the method according to claim 1, wherein the computer system is a part of or comprises a reality capture device comprising at least one laser scanner and/or time-of-flight camera.

14. A computer program product comprising program code stored in a non-transitory machine-readable medium for performing the method according to claim 1.

15. A computer-implemented method for generating anonymized 3D data of a surrounding, the surrounding comprising a multitude of 3D features of a plurality of feature categories, the plurality of feature categories including at least a first feature category, 3D features of which being designated for anonymization, the method comprising providing 3D data of the surrounding, the 3D data comprising information about a mesh or a point cloud comprising 3D patterns of a plurality of pattern types, the 3D patterns corresponding to the 3D features in the surrounding, wherein a first pattern type corresponds to the first feature category, comprising:
identifying at least a first portion of the mesh or point cloud that comprises at least a first 3D pattern of the first pattern type, the first portion of the mesh or point cloud corresponding to a first data portion of the 3D data;
obtaining at least one alternative 3D pattern for the first pattern type, each alternative 3D pattern comprising pre-defined or generated 3D data; and
replacing, using an anonymization algorithm, the first data portion with alternative 3D data comprising at least one alternative 3D pattern for the first pattern type to generate anonymized 3D data,
wherein:
the 3D features in the surrounding comprise 3D alphanumeric characters comprising letters and/or numerals;
the first feature category comprises alphanumeric characters, texts or numbers; and
the alternative patterns include 3D alphanumeric characters,

wherein identifying the first portion in the mesh or point cloud comprises detecting 3D features representing alphanumeric characters.

16. The method according to claim 15, wherein:

the 3D features in the surrounding comprise at least one text or number comprising a sequence of 3D alphanumeric characters; and the alternative patterns include texts or numbers comprising a plurality of alphanumeric characters.

17. The method according to claim 15, wherein:

the alternative 3D patterns are user-defined patterns comprising 3D data that is generated based on a user input;

the method comprises generating 3D data based on the user input; and the first portion of the 3D data is replaced with the generated 3D data.

18. The method according to claim 17, wherein the user input comprises:

at least one alphanumeric character, or a text or number comprising plurality of alphanumeric characters; and/ or a typeface or at least one of a font, size, weight, slope and width for the alphanumeric characters.

19. A computer system configured for performing the method according to claim 15, wherein the computer system is a part of or comprises a reality capture device comprising at least one laser scanner and/or time-of-flight camera.

20. A computer program product comprising program code stored in a non-transitory machine-readable medium for performing the method according to claim 15.

\* \* \* \* \*